(12) United States Patent
Chen

(10) Patent No.: US 7,011,318 B2
(45) Date of Patent: Mar. 14, 2006

(54) STROLLER WITH BASKET

(75) Inventor: Shun-Min Chen, Taipei (TW)

(73) Assignee: Wonderland Nurserygoods Co., Ltd., (TW)

( * ) Notice: Subject to any disclaimer, the term of this patent is extended or adjusted under 35 U.S.C. 154(b) by 0 days.

(21) Appl. No.: 10/630,269

(22) Filed: Jul. 30, 2003

(65) Prior Publication Data
US 2005/0023783 A1 Feb. 3, 2005

(51) Int. Cl.
B62B 9/12 (2006.01)

(52) U.S. Cl. ................ 280/47.38; 280/47.35; 224/409

(58) Field of Classification Search ......... 280/642, 280/647, 650, 47.34, 47.35, 47.38, 47.4; 224/409
See application file for complete search history.

(56) References Cited

U.S. PATENT DOCUMENTS

| D305,218 | S | * | 12/1989 | Nakao et al. ............. D12/129 |
|---|---|---|---|---|
| 4,923,208 | A | * | 5/1990 | Takahashi et al. ......... 280/642 |
| 4,953,887 | A | * | 9/1990 | Takahashi et al. ......... 280/647 |
| 5,741,021 | A | * | 4/1998 | Saint et al. ............. 280/47.38 |
| 6,062,589 | A | * | 5/2000 | Cheng ..................... 280/647 |
| 6,402,186 | B1 | * | 6/2002 | Garland .................... 280/647 |
| 6,416,076 | B1 | * | 7/2002 | Hou et al. ................ 280/642 |
| 6,830,168 | B1 | * | 12/2004 | Hou ....................... 224/409 |
| 2004/0222608 | A1 | * | 11/2004 | Espenshade ........... 280/47.38 |
| 2005/0040625 | A1 | * | 2/2005 | Chen ...................... 280/642 |
| 2005/0121871 | A1 | * | 6/2005 | Arai et al. ............. 280/47.38 |
| 2005/0146104 | A1 | * | 7/2005 | Kassai et al. .......... 280/47.38 |

* cited by examiner

Primary Examiner—Jeff Restifo
(74) Attorney, Agent, or Firm—Gauthier & Connors LLP

(57) ABSTRACT

A stroller with a basket comprises a backrest, a seat, a frame assembly, a basket, and a plurality of wheels. The frame assembly includes an U-shaped handlebar, two first rods and two second rods, connected with each other. The frame assembly further includes two first blocks respectively fixed to both second rods. The basket has a basket frame, a basket body attached to the basket frame, and two second blocks respectively secured to both sides of the basket frame. The basket frame can be formed by two rod telescopically coupled with each other or alternatively by bending a flexible rod. When the second block is supported on the first block, the basket is spread out and the distance between the basket frame and the seat is smaller. When the second block is separated from the first block or located beneath the first block, the basket can be descended so that the distance between the basket frame and the seat is larger in favor of putting the articles into and taking the articles from the basket.

9 Claims, 6 Drawing Sheets

STROLLER WITH BASKET

FIELD OF THE INVENTION

The present invention relates generally to a stroller with a basket, and more particularly to a stroller with a basket whose basket frame can be adjusted in height.

BACKGROUND OF THE INVENTION

As illustrated in FIG. 1, the conventional perambulator 9 includes a frame assembly 1, a seat 2 and a backrest 3 installed into an upper part of the frame assembly 1, and a (storage) basket 4 and a plurality of wheels 5 provided within a lower part of the frame assembly 1. Therein, the seat 2 can be adapted for an infant (toddler and small child) to sit upright, recline or lie thereon depending on the angle relative to the seat 2 adjusted. The basket 4 is allowed to store the articles for the infant or bought in the supermarket.

However, the storage basket 4 installed in the above-mentioned conventional perambulator 9 is too close to the seat 2 or the backrest 3 adjusted for the infant to recline or lie on, which results in the inconvenience about putting the articles into and taking the articles from the basket 3 or disturbing the infant in the conventional perambulator 9. Especially, The crying and annoying of the infant after being waked from deeply sleeping extremely perplex the infant's parents.

SUMMARY OF THE INVENTION

Accordingly, the present invention relates to a stroller with a basket that can substantially obviate one or more of the problems due to the limitations and disadvantages of the related arts.

One object of the present invention is the provision of a stroller with a basket whose basket frame can be adjusted in height.

Another object of the present invention is the provision of a stroller with a basket which is convenient to put the articles into and take those from.

It is a further object of the present invention to provide a stroller with a basket not to bother the infant therein during putting the articles into and taking those from the basket.

Additional features and advantages of the invention will be set forth in the description which follows, and in part will be apparent from the description, or may be learned by practice of the invention. The objectives and advantages of the invention will be realized and attained by the structure particularly pointed out in the written description and claims hereof as well as the appended drawings.

To achieve these and other advantages and according to the purpose of the present invention, as embodied and broadly described, a stroller with a basket comprises a frame assembly having a bottom end and a first block, a plurality of wheels pivotally connected to the bottom end of the frame assembly, a backrest connected to the frame assembly, a seat connected to the frame assembly and located under the backrest, and a basket connected to the frame assembly and located under the backrest. The basket has a basket body and a basket frame adjoined to the basket body and pivotally connected to the frame assembly. Whereby, the basket can be adjusted in height by means of altering the position of the basket frame relative to the first block.

It is preferred that the frame body respectively has the first blocks at both sides for supporting the basket frame.

Preferably, the basket frame is flexible so as to change the position thereof relative to the first block.

Alternatively, the first block respectively has an inclined side surface adjacent to the seat and the wheels, and the inclination of the former is smaller so as to enable the first block to securely support the basket frame and stretch the basket body.

Advantageously, the basket frame is telescopic and further has a second block, so that when the basket frame is in an retractive position, the second block touches with the first block, while when the basket frame is in a stretchy position, the second block separates from the first block.

It is preferred that the basket frame has an inner rod having a slot, an outer rod telescopically coupled with the inner rod, and an elastic element accommodated in the inner rod, and a fastener penetrates the second block, the outer rod, and the slot and at the same time restricts the elastic element to situate at one end of the inner rod.

It is preferred that the first block has a block body and an ear, having a curved surface abutting to the frame assembly to prevent the second block from moving.

It is preferred that the block body has a first side and a second side with different inclination so as to securely support the basket frame and adjust the basket frame in height.

It is preferred that the frame assembly respectively has the first blocks at both sides and also the basket frame correspondingly has two second blocks.

It is to be understood that both the forgoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principle of the invention. In the drawings.

DETAILED DESCRIPTION OF THE INVENTION

The rods described hereinafter include hollow tubes and also the elements similar to those described hereinbefore are numbered the same.

Figure 1:
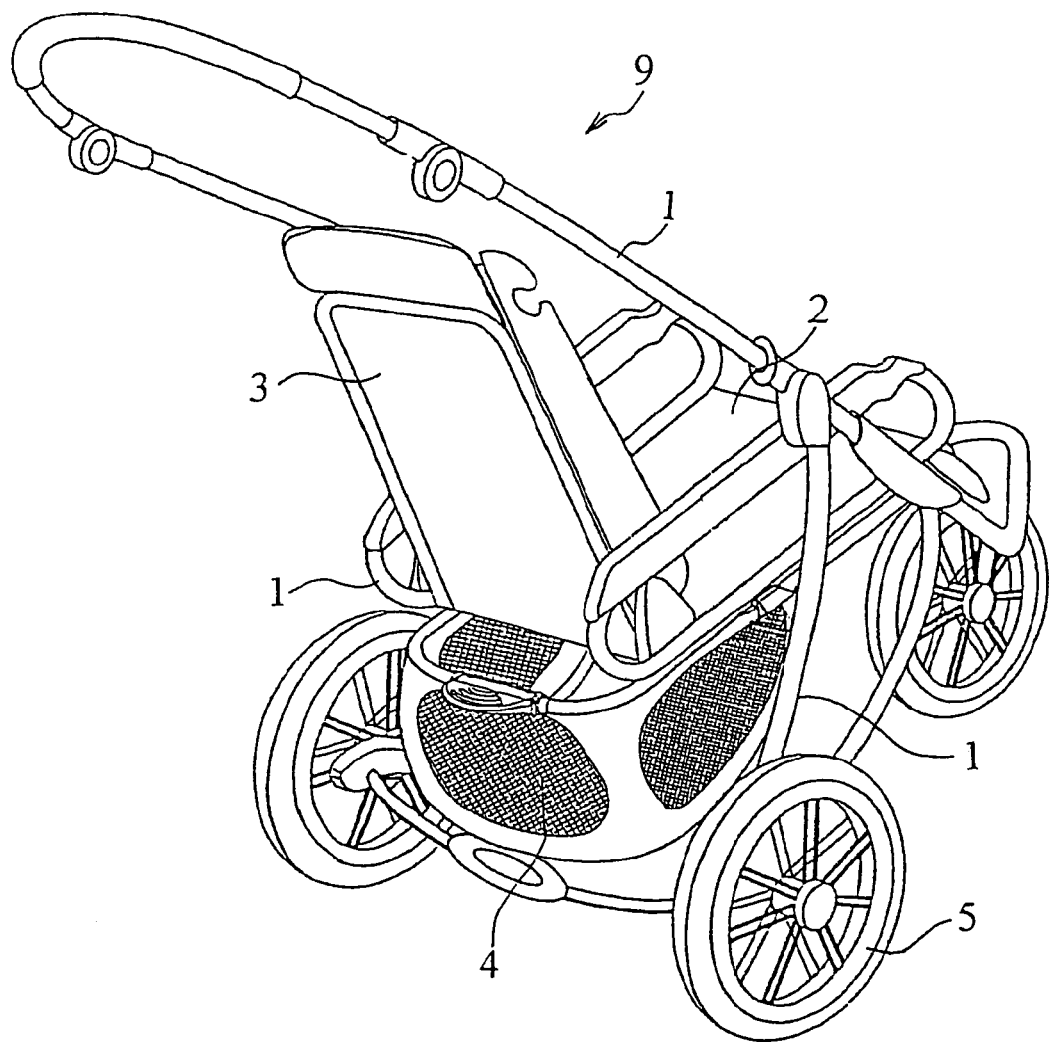
FIG. 1 is an assembled perspective view illustrating a conventional perambulator.
Figure 2:
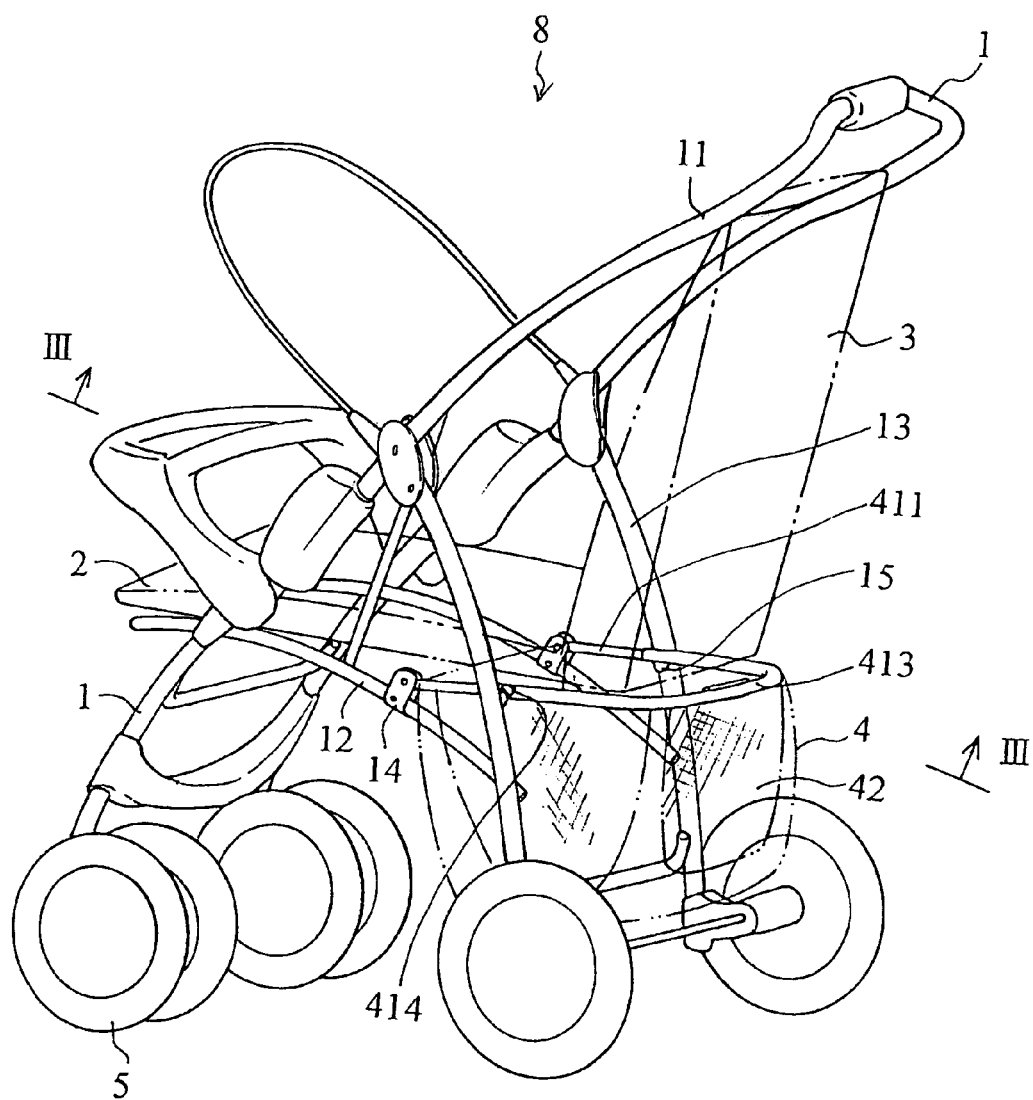
FIG. 2 is an assembled perspective view of the first preferred embodiment according to the present invention about a stroller with a basket.
Figure 3:
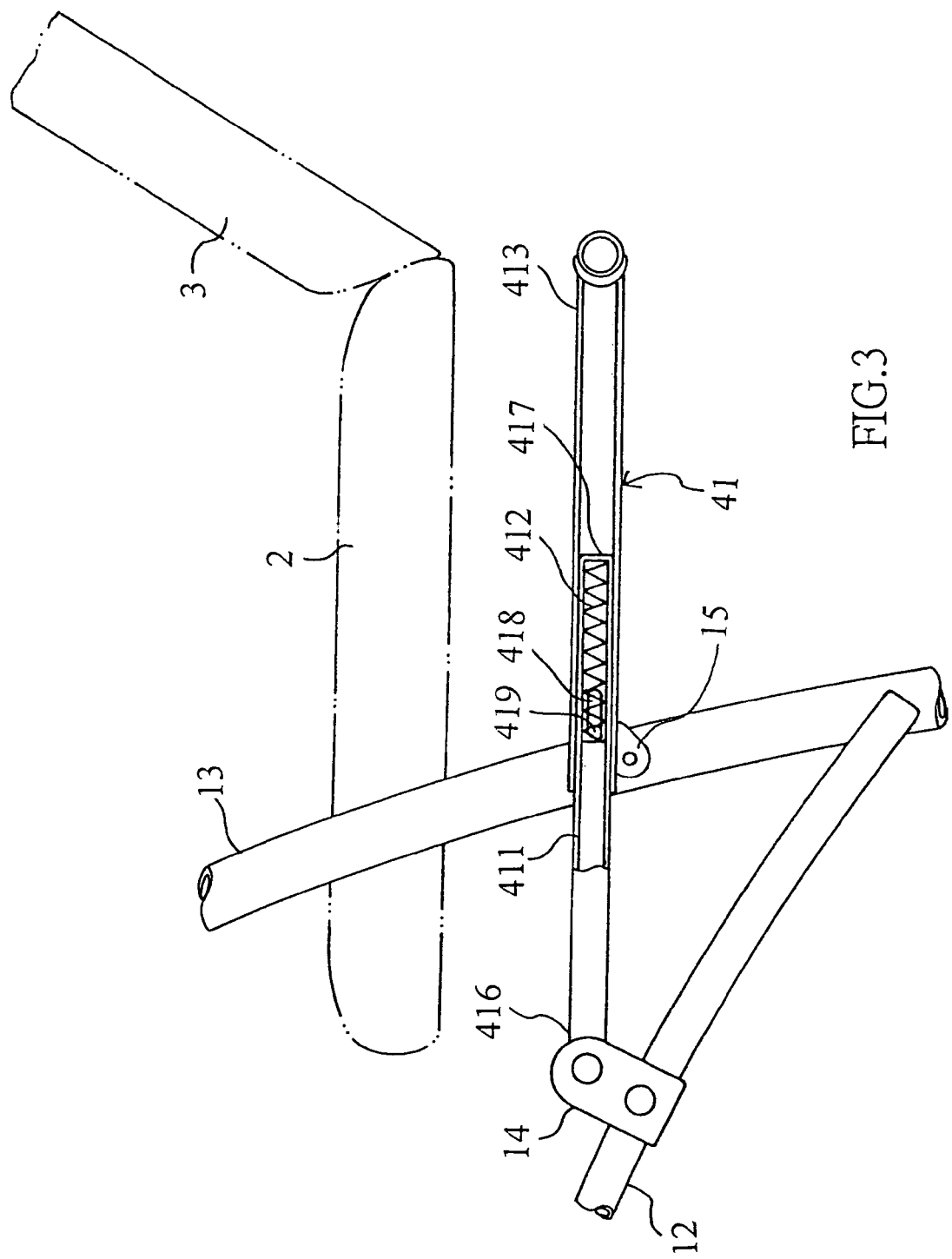
FIG. 3 is a partial side view taken along the section III—III illustrating the section of the basket frame in a higher position.

Referring now to FIGS. 2 and 3, a stroller 8 with a (storage) basket 4 according to the first preferred embodiment of the present invention includes a frame assembly 1, a seat 2 installed at a middle part of the frame assembly 1, a backrest 3 pivotally connected to an end of the seat 2 and an upper part of the frame assembly 1, a basket 4 connected to the lower part of the frame assembly 1, and a plurality of wheels pivotally connected to a bottom end of the frame assembly 1.

The frame assembly 1 comprises a rectangular handlebar11, two parallel first rods 12, two parallel second rods 13, all of which are secured together by such as soldering, screwing, pivoting and substantially formed to a triangle. The frame assembly 1 further comprises a hinge fixed at an end of the first rod 12 near the second rod 13, and a first block 15 fixed at an end of the second rod 13 near the first rod 12.

Figure 4:
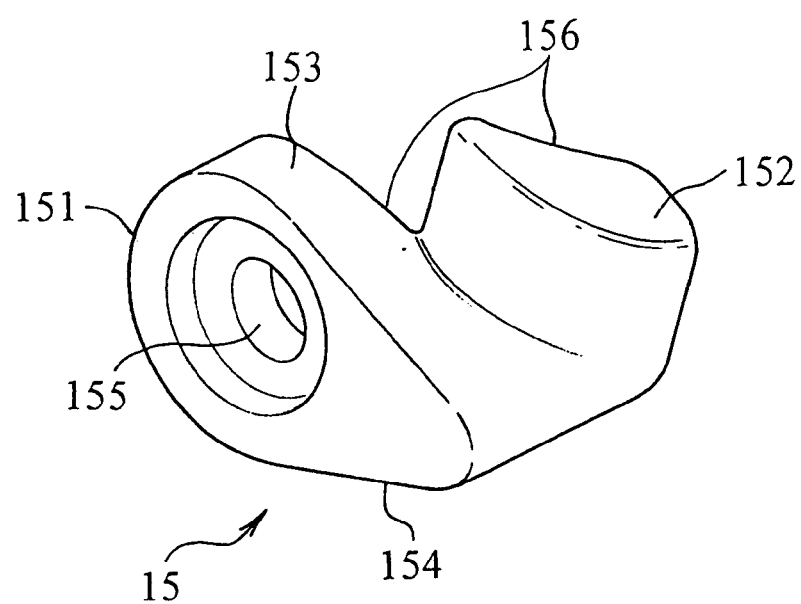
FIG. 4 is a perspective view of the first preferred embodiment illustrating the first block.
Figure 6:
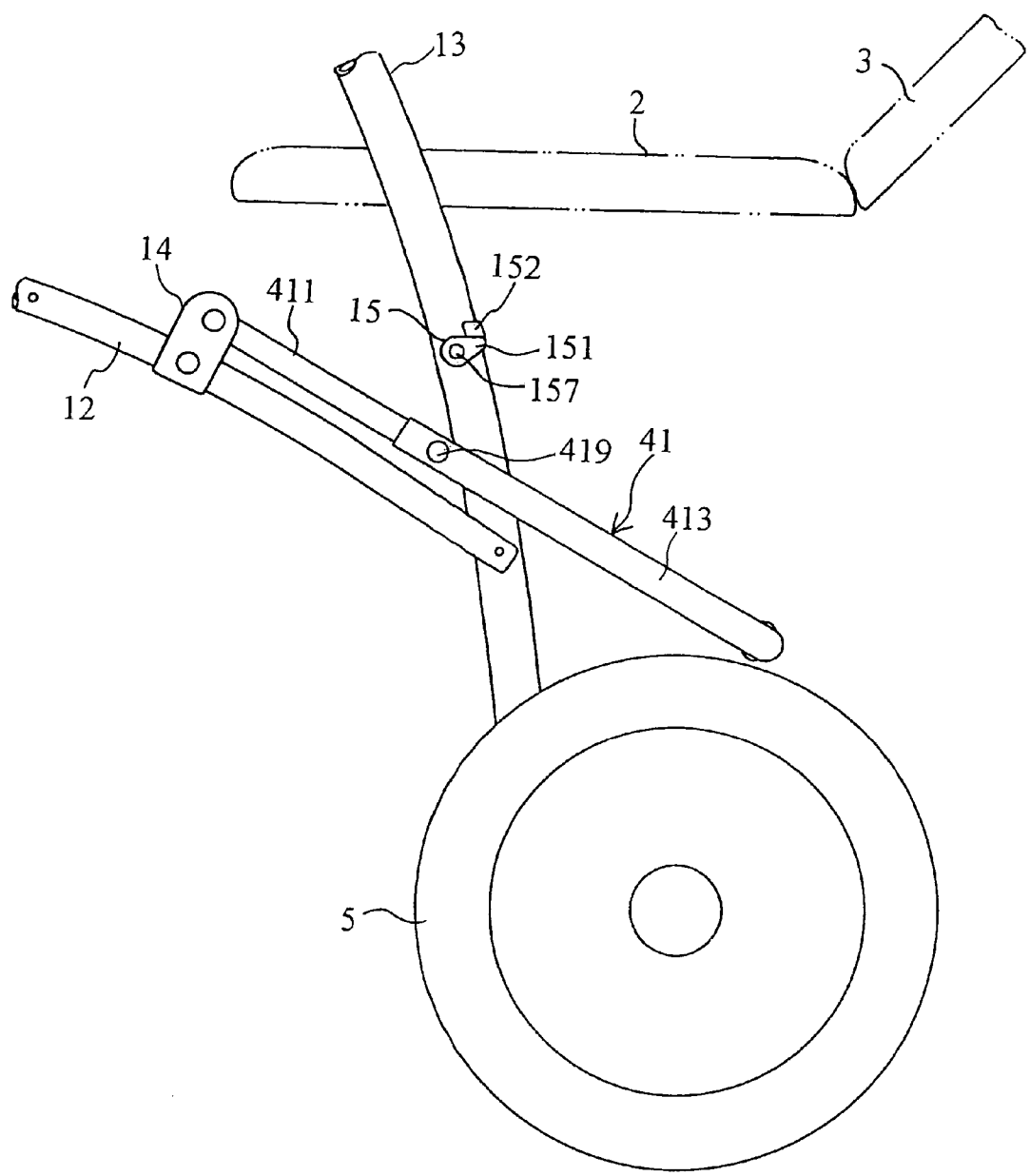
FIG. 6 is a partial side view similar to the FIG. 3 and illustrates the basket frame in a lower position.

As shown in FIGS. 4 and 6, the first block 15 has a block body 151 substantially like a water drop in whole profile having a larger arc and a smaller arc opposite to the larger arc, and a curved ear transversely protruding from the smaller arc. The block body 151 further has an upper first side, a lower second side, a spot-faced hole through the larger arc. The surface opposite to the spot-faced hole 155 of the block 151 and a surface of the ear 152 continuously form a curved surface 156. By penetrating the spot-faced hole 155 with a first fastener 157, the first block 15 is secured to the second rod 13 in the state that the curved surface 156 abuts against the outer surface of the second rod 13, the first side 153 of the first block 15 is substantially horizontal, and the second side 154 upwardly inclines. The abutmemt of the curved surface 156 can hinder the first block 15 from rotating after being fixed by the first fastener 157. The horizontal first side 153 can stably support a basket frame 41 described hereinafter. The upwardly inclined second side 154 is in favor of the basket frame 41 to be lifted from a lower position so as to stretch a basket body 42 described hereinafter.

Figure 5:
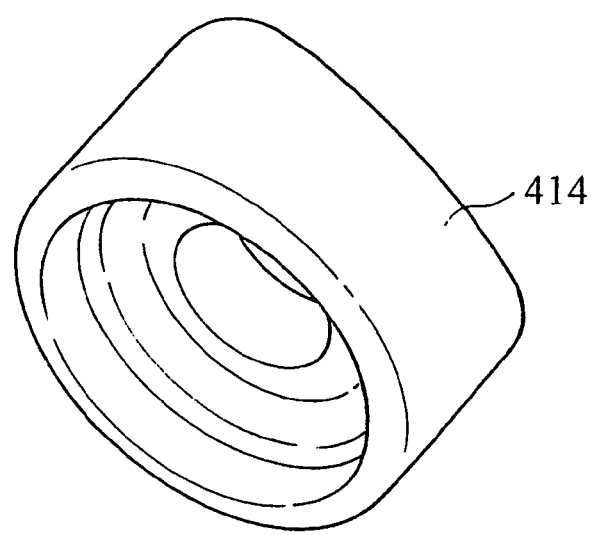
FIG. 5 is a perspective view of the first preferred embodiment illustrating the second block.

As illustrated in FIGS. 2 and 3, the basket 4 includes a basket frame 41 in substantially U shape and a flexible net-like basket body 42 attached to the basket frame 41. The basket frame 41 further includes two third rods 411, two elastic elements 412, a forth rod 413 U-shaped, and two cylinder-like second blocks 414 (shown in FIG. 5).

Each of the third rods 411 has a pivoted end 416, a close end 417 opposite to the pivoted end 416, and a slot 418 between the two ends 416, 417. The pivoted end 416 is pivotally connected with the hinge 14 on the first rod12. An elastic element 412 is accommodated in each of the third rods 411 near the closed end 417 which is respectively and telescopically inserted into one of two open ends of the forth rod 413 U-shaped. A second fastener 419 penetrates a spot-faced hole of the second block 414, the forth rod 413, the slot 418 of the third rod 411, and the elastic element 412 in sequence, and make the curved surface of the second block 414 abut the forth rod 413 so as to fix the second block 414 onto the forth rod 413 and simultaneously engage and limit the elastic element 412 at the close end 417 of the third rod 411.

As illustrated in FIGS. 2 and 3, by means of the aforesaid structures assembled, when the second block 414 of the basket frame 41 is situated on the first side 153 of the first block 15 and no external force exerts on the elastic element 412 in a normal state, the basket frame 41 is securely supported by the first block 15 on the horizontal first side153 and spreads out the basket body 42 in order to allow the basket 4 to store a large quantity of articles. However, when the forth rod 413 U-shaped of the basket frame 41 is pulled in a direction of departing from the stroller 8 (i.e. backward), the second fastener 419 and the second block 414 move with the forth rod 413. In the meantime, the second fastener 419 slides along the slot 418 and compresses the elastic element 412. When the second block 414 completely offsets with the first block 15, the basket frame 41 can pivot clockwise upon the hinge 14 in a state like FIG. 6 in order to conveniently put articles into and take those from the basket 4 and there exists no worry about bothering the infant, toddler or small child in the stroller 8. After finishing the actions, the only operation needed is to pivot the basket frame 41 counter-clockwise upon the hinge 14 with one hand, or further with a slight pull backward. Then the second block 414 can easily slide beneath and across the second side inclined upward of the first block 15. Besides, by the aid of the restoration force resulted from the elastic element 412, the second block 414 is always kept on the first side153 of the first block15 (as shown in FIG. 3) and the basket body 42 is in the state of being spread out.

Alternatively, in the first preferred embodiment according the present invention, the elastic element 412 can be replaced by a latch (not shown). The second block 414 can longitudinally align with and be securely supported by the first block 15 by means of the latch temporarily engaging the third rod 411 and the forth rod 413. While the forth rod 413 is pulled backward to the extent that the latch escapes from its engaging position, the second block 414 can completely offset with the first block 15 and the basket frame 41 can be adjusted in height.

Figure 7:
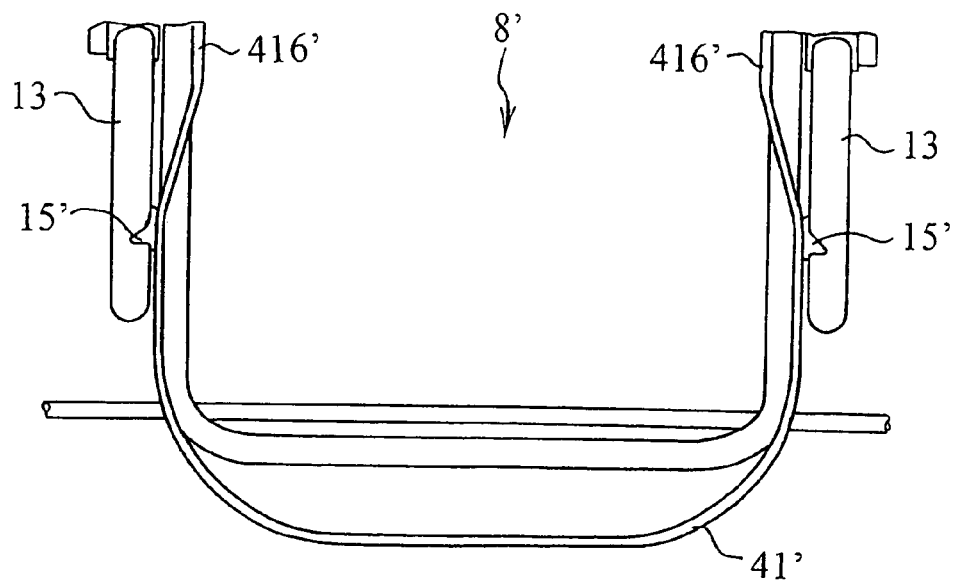
FIG. 7 is a partial top plane view of the second preferred embodiment according to the present invention illustrating the state of the basket frame supported by the first block.
Figure 8:
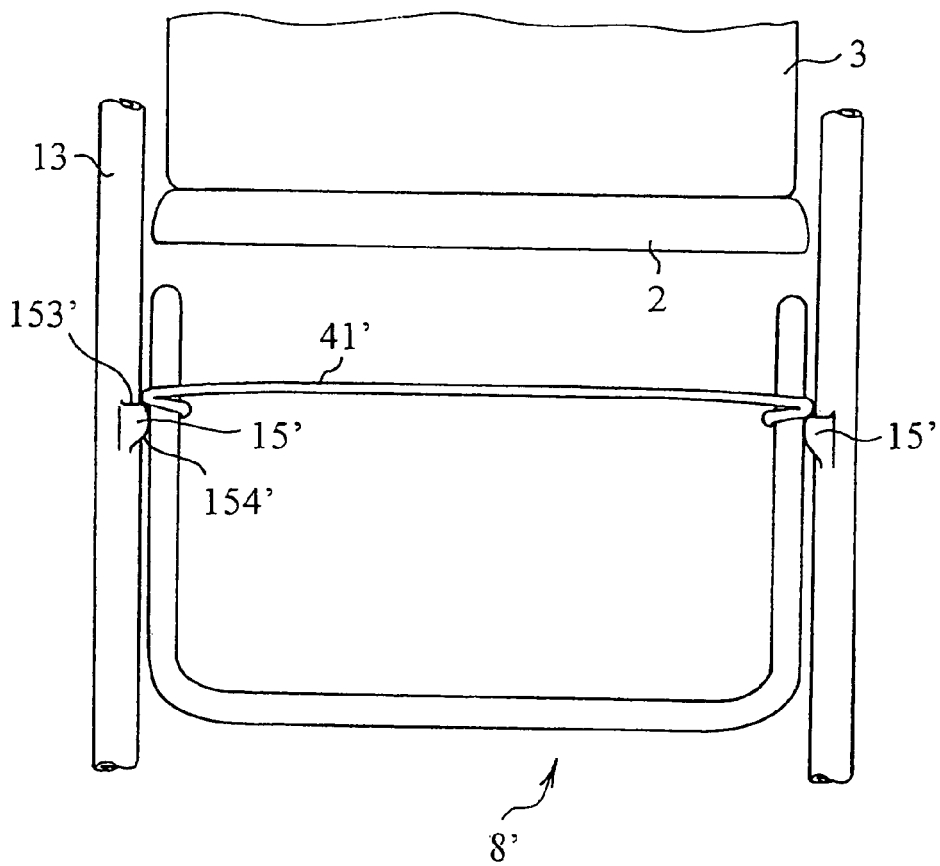
FIG. 8 is a partial back view of the second preferred embodiment according to the present invention illustrating the state of the basket frame supported by the first block.

What is shown in FIGS. 7 and 8 is the second preferred embodiment of the present invention. It is the first block 15 and the basket frame 41 that there exists some differences between the stroller 8' according to the second preferred embodiment and the stroller 8 according to the first preferred embodiment. Therefore, only the two parts are described hereinafter and the correspondent numbers are added a "'" so as to be distinguished.

Two first blocks 15' trapezoid-shaped in longitudinal section are respectively soldered (riveted, screwed) to the side of each second rod 13. The first block 15' has an upper first side 153' substantially horizontal and a lower second side 154' inclining upwardly.

Instead of telescopically coupling with each other by the third rod 411 and the forth rod 413 in the first preferred embodiment, the basket frame 41' according to the second preferred embodiment is bent from a flexible rod and formed a U shape. Each of the two pivot ends at the open of the U-shaped basket frame 41' is respectively pivotally connected to the hinge 14.

When the basket frame 41' is on the first side 153' of the first block 15', the basket frame 41' stretches the basket body 42 to receive the articles. When the basket frame 41' is pressed downward by a hand, the basket frame 41' can slide across the first side 153' due to the elastic and inward deformation resulting from two sides of the basket frame 41'. Till the basket frame 41' slides to the second side 154', the two sides of the basket frame 41' restore outwardly. At this moment, the basket frame 41' can continue rotating downward so as to enlarge the distance between the basket frame 41' and the seat 2 in favor of putting the articles into and taking those out of the basket 4. Conversely, if the basket frame 41' is pivotally rotated upwardly, because the second side 154' of the first block 15' inclines upward, the basket frame 41' can easily slide across the second side 154' and to the first side 153' due to elastic deformation inward and then be securely supported on the first side 153'.

Summing up the above description, the stroller 8, 8' with the basket 4 according to the present invention is indeed able to achieve the objects that the basket frame 41, 41' can be adjusted in height (with one hand), the basket 4 is convenient to put the articles into and take those from, and there is no worry to bother the infant therein during putting the articles into and taking those from the basket.

This invention has been disclosed in terms of specific embodiments. It will be apparent that many modifications can be made to the disclosed structures without departing from the invention. Therefore, it is the intent of the appended claims to cover all such variations and modifications as come within the true sprit and scope of this invention.

What is claimed is:

1. A stroller with a basket, comprising:
   a frame assembly having a bottom end and a first block;
   a plurality of wheels pivotally connected to the bottom end of the frame assembly;
   a backrest connected to the frame assembly;
   a seat connected to the frame assembly and located under the backrest; and
   a basket connected to the frame assembly and located under the seat, the basket having a basket body and a basket frame which is adjoined to the basket body and pivotally connected to the frame assembly;
   whereby, the basket can be adjusted in height by means of altering the position of the basket frame relative to the first block, and wherein the basket frame is telescopic and further has a second block, so that when the basket frame is in a retractive position, the second block touches with the first block, while when the basket frame is in a stretchy position, the second block separates from the first block.

2. The stroller with the basket as claimed in claim 1, wherein the frame body respectively has the first block at both sides for supporting the basket frame.

3. The stroller with the basket as claimed in claim 2, wherein the first block respectively has an inclined side surface adjacent to the seat and the wheels, and the inclination of the former is smaller so as to enable the first block to securely support the basket frame and stretch the basket body.

4. The stroller with the basket as claimed in claim 1, wherein the basket frame is flexible so as to change the position thereof relative to the first block.

5. The stroller with the basket as claimed in claim 1, wherein the basket frame has an inner rod having a slot, an outer rod telescopically coupled with the inner rod, and an elastic element accommodated in the inner rod; and a fastener penetrates the second block, the outer rod, and the slot and at the same time restricts the elastic element at an end of the inner rod.

6. The stroller with the basket as claimed in claim 1, wherein the first block has a block body and an ear, having a curved surface abutting to the frame assembly to prevent the first block from moving.

7. The stroller with the basket as claimed in claim 6, wherein the block body has a first side and a second side with different inclinations so as to securely support the basket frame and adjust the basket frame in height.

8. The stroller with the basket as claimed in claim 1, wherein the frame assembly respectively has the first block at both sides and also the basket frame correspondingly has two second blocks.

9. The stroller with the basket as claimed in claim 1, wherein the first block has a first side and a second side with different inclinations.

* * * * *